United States Patent [19]
Cerboni

[11] Patent Number: 5,683,728
[45] Date of Patent: *Nov. 4, 1997

[54] MOLD CONVEYING ARRANGEMENT

[75] Inventor: Renzo Cerboni, Milan, Italy

[73] Assignee: Carle & Montanari S.p.A., Milan, Italy

[*] Notice: The term of this patent shall not extend beyond the expiration date of Pat. No. 5,591,464.

[21] Appl. No.: 364,672

[22] Filed: Dec. 27, 1994

[30]   Foreign Application Priority Data

Dec. 29, 1993  [IT]  Italy ................... MI93A2754

[51] Int. Cl.$^6$ ................... B28B 5/02; B28B 5/04
[52] U.S. Cl. ................... 425/453; 249/126
[58] Field of Search ................... 249/120, 126; 425/453, 457, DIG. 200, DIG. 201; 264/513

[56]   References Cited

U.S. PATENT DOCUMENTS

| | | | |
|---|---|---|---|
| 3,015,287 | 1/1962 | Noel | 425/453 |
| 3,082,709 | 3/1963 | Jacobsen | 425/453 |
| 3,778,018 | 12/1973 | Abalo | 425/453 |
| 3,981,656 | 9/1976 | Sleels et al. | 425/453 |
| 4,135,872 | 1/1979 | Cerboni | 425/453 |
| 4,330,245 | 5/1982 | Billett et al. | 425/126 |
| 4,366,941 | 1/1983 | Harris | 249/119 |
| 4,954,069 | 9/1990 | Friedwald | 425/453 |

FOREIGN PATENT DOCUMENTS 7315323  11/1973  Netherlands ................... 425/453

*Primary Examiner*—Khanh P. Nguyen
*Attorney, Agent, or Firm*—Kirschstein, et al.

[57]   ABSTRACT

A mold conveying arrangement includes a mold having at least one well for receiving chocolate to be conveyed through molding workstations. The mold extends along a longitudinal direction between opposite end regions, and also extends along a transverse direction perpendicular to the longitudinal direction. The mold has projections generally extending in a downward direction perpendicular to the longitudinal and transverse directions. A movable conveyor extends along the transverse direction below the mold. The conveyor engages the projections and moves the mold along the transverse direction.

11 Claims, 6 Drawing Sheets

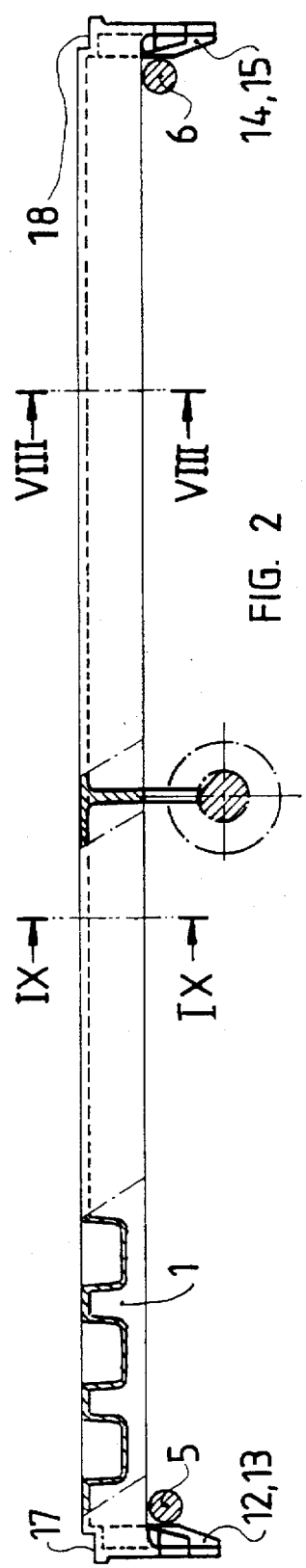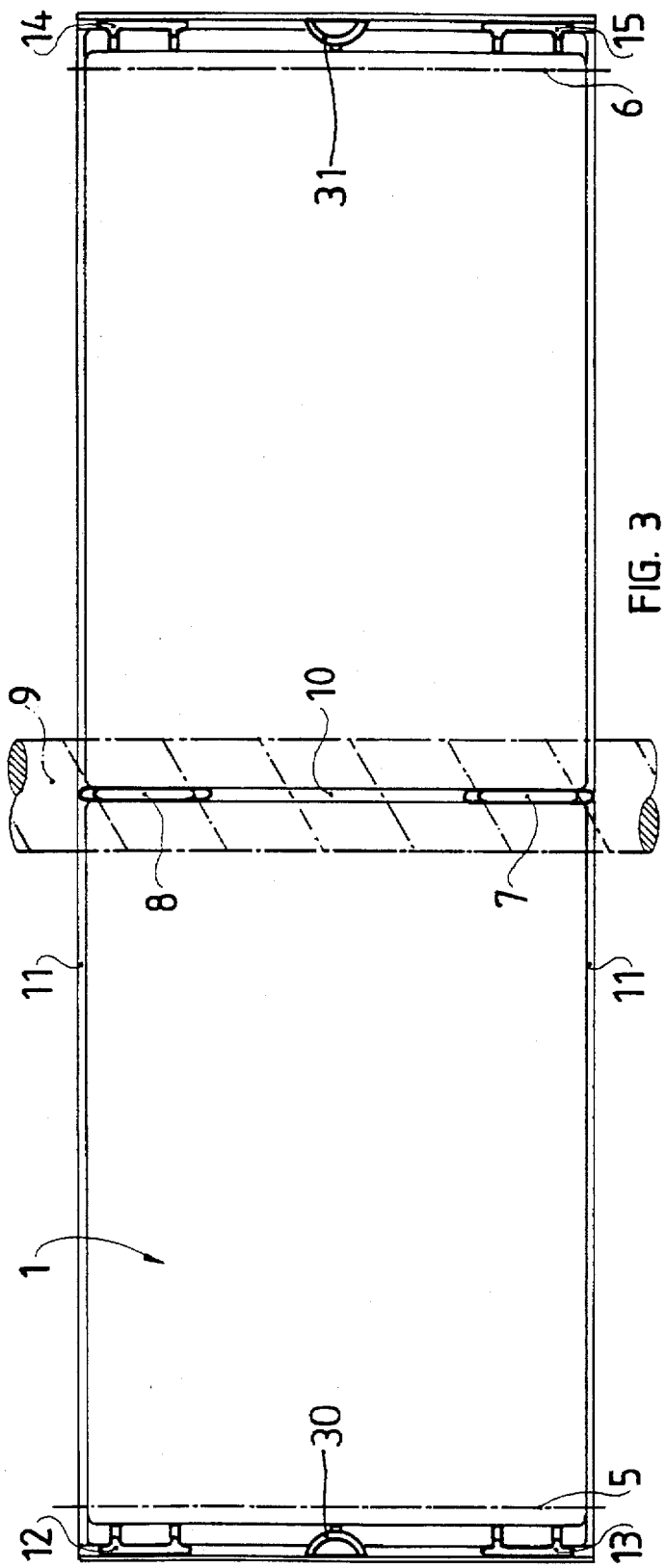

05,683,728

MOLD CONVEYING ARRANGEMENT

BACKGROUND OF THE INVENTION

The present invention relates to a mold used in plants for molding chocolate or similar food products.

It is known that the molds being used at present to mold chocolate or similar products basically consist of a parallelepipedal body which is made of a synthetic material and has wells in its top surface into which the food product to be subsequently treated, for example in a chilling plant or in other stations known from the prior state of the art, is poured.

Until now, it has been customary to convey the molds through the production plant using two parallel chains fitted with projecting entraining devices which, as they came into contact with the mold bodies, pushed them through the molding plant.

The use of chains as conveying means has, however, the disadvantage that considerable gaps need to be kept between the individual molds in order to enable the entrainment means to engage unhindered with the rear end of the parallelepipedal mold. This requirement entails a reduction in the useful surface available for filling with chocolate or similar product and, consequently, known molding plants need to be equipped with longer and therefore more expensive conveyors.

The result of employing parallel chains to convey the moulds was that movement of the moulds in a vertical plane created considerable difficulties and it was always necessary to use paternoster-type systems which are very expensive, not very practical and not ideal from the point of view of efficiency of the thermal unit, for example a chilling cabinet, in which the conditioning and cooling of the products contained in the molds took place.

Finally, known molds which were made to advance using parallel chains gave rise to serious food hygiene problems since the molds were being contaminated by dirt and by the lubricant of the chains. Cleaning, especially cleaning the side surfaces of the molds, on which excess product collected, was awkward or downright impossible.

SUMMARY OF THE INVENTION

The object of the present invention is to propose a new mold of the type indicated, with which it should be possible to overcome the disadvantages of the prior state of the art, enabling the mold to be conveyed in a horizontal plane and in a vertical plane, without the use of chains, thereby simplifying the structure of the molding plant, making it more hygienic, enabling the product to be cooled more efficiently, permitting the molds to be stacked easily and enabling them to be conveyed in a controlled manner in a horizontal plane and in a vertical plane.

This object is achieved using a mold for chocolate or similar products, which has protrusions projecting from the underside of the mold. The protrusions engage with geometric coupling with the turns of a screw which can be actuated in a controlled manner and extends through the molding plant.

It is particularly advantageous to provide projections at opposite ends of the mold, which projections are oriented downwards and delimit a recess which accommodates means on which the mold is supported and slides.

It is also advantageous for the projections, provided at the ends of the mold, to form small support feet for the mold.

It is particularly advantageous for the two opposite ends of the mold to each have a step-like indentation which forms a support recess for the feet of a superjacent mold.

BRIEF DESCRIPTION OF THE DRAWINGS

Further advantages and characteristics of the invention will be made clearer in the following description of the invention, the claims and the appended drawings.

The subject, designed according to the present invention, will now be described in greater detail and illustrated, by means of an embodiment which is given solely by way of example, in the appended drawings, in which:

FIG. 2 shows the mold of FIG. 1 seen from the front and partially in section;

FIG. 3 shows the mold of FIG. 1 seen from below;

DETAILED DESCRIPTION OF THE PREFERRED EMBODIMENT

Figure 1:
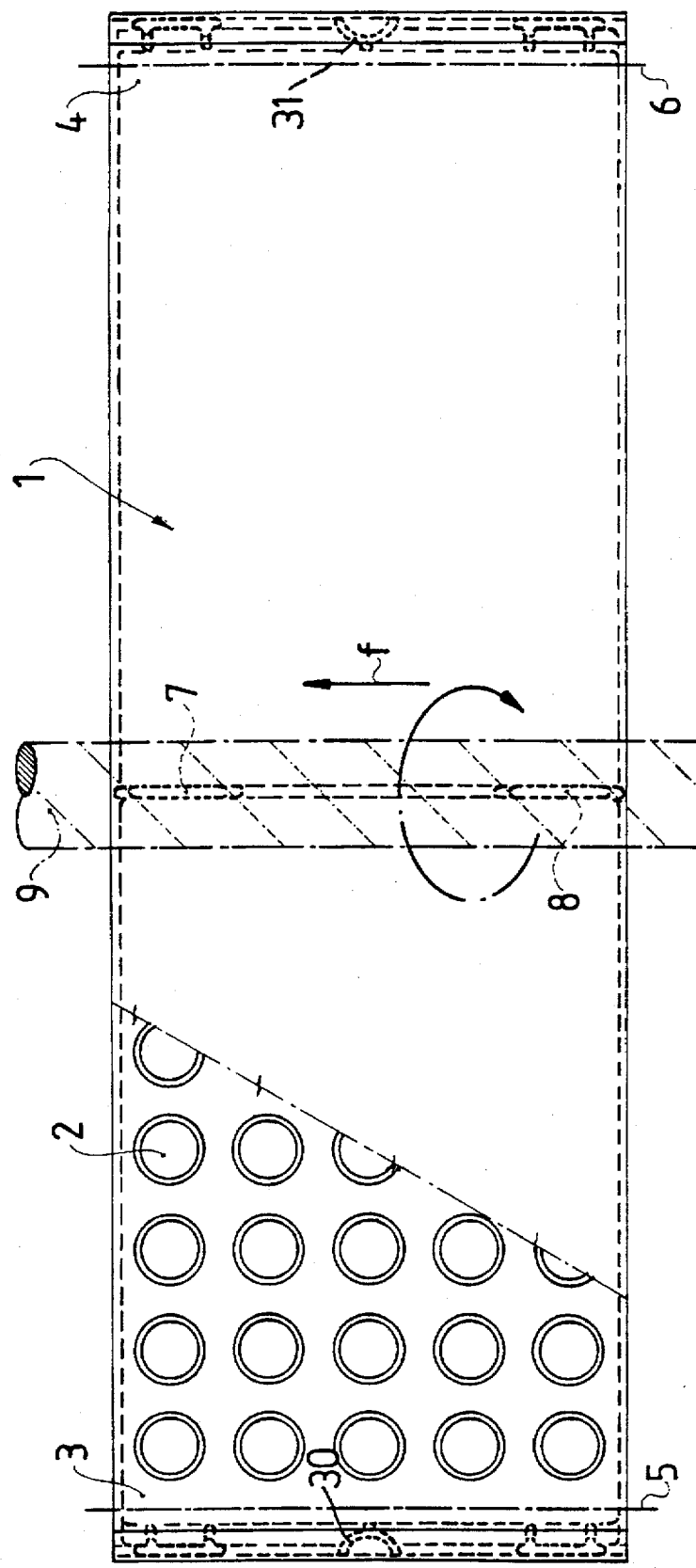
FIG. 1 shows a mold, designed according to the present invention, seen from above.

As may be seen from FIG. 1, the mold 1 as proposed by the present invention consists of a parallelepipedal body which is advantageously made of a suitable synthetic material, for example polycarbonate. The upward facing surface of the mold 1 accommodates wells 2 into which the chocolate or other material is introduced in a pasty liquid state.

The mold is supported via its lateral ends 3 and 4 on parallel guides 5 and 6, which for example consist of rods which act as support and guide means for the mold 1.

In order to be able to move the mold in a controlled manner in the direction of arrow f, protrusions 7 and 8 project downwards from the bottom of each mold 1 and engage with the turns of an actuating screw 9 which is connected for example to a controllable motor.

From FIGS. 2 and 3 it may be seen that the protrusions 7 and 8 project from a transverse rib 10 on the mold, this rib being advantageously integral with a peripheral reinforcing rib 11, these components acting together to stiffen the box-like structure of the mold 1.

Figure 9:
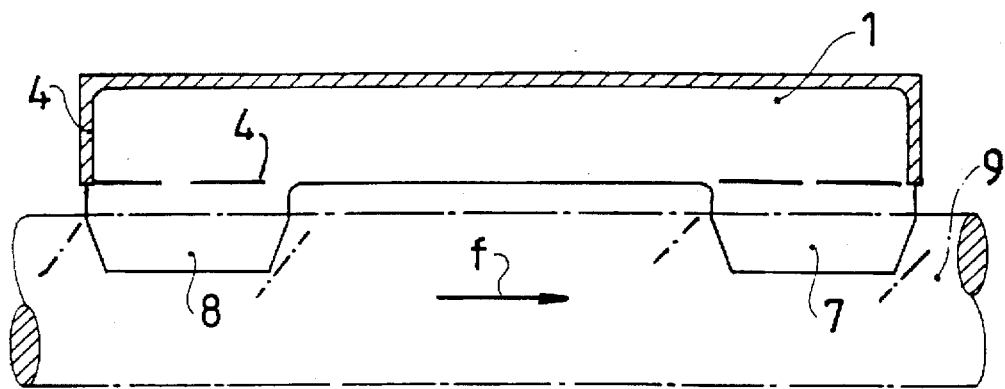
FIG. 9 shows the mold in section along the line IX—IX of FIG. 2.

It may be seen from FIG. 9 that the protrusions 7 and 8 are trapezoidal in shape, tapering downwards, and therefore the screw thread of the screw 9 will also be made in the form of a trapezoidal screw thread with a suitable pitch.

In order to achieve perfect guiding of the molds 1, they are supported via their shorter opposite ends on guides 5, 6 which extend over the entire length of the molding plant. Advantageously, the guides are made in the form of rods, which ensure the best possible guiding action, minimum friction and ease of cleaning.

Small feet 12, 13 and 14, 15 project downwards from the ends of the mold 1.

Figure 4:
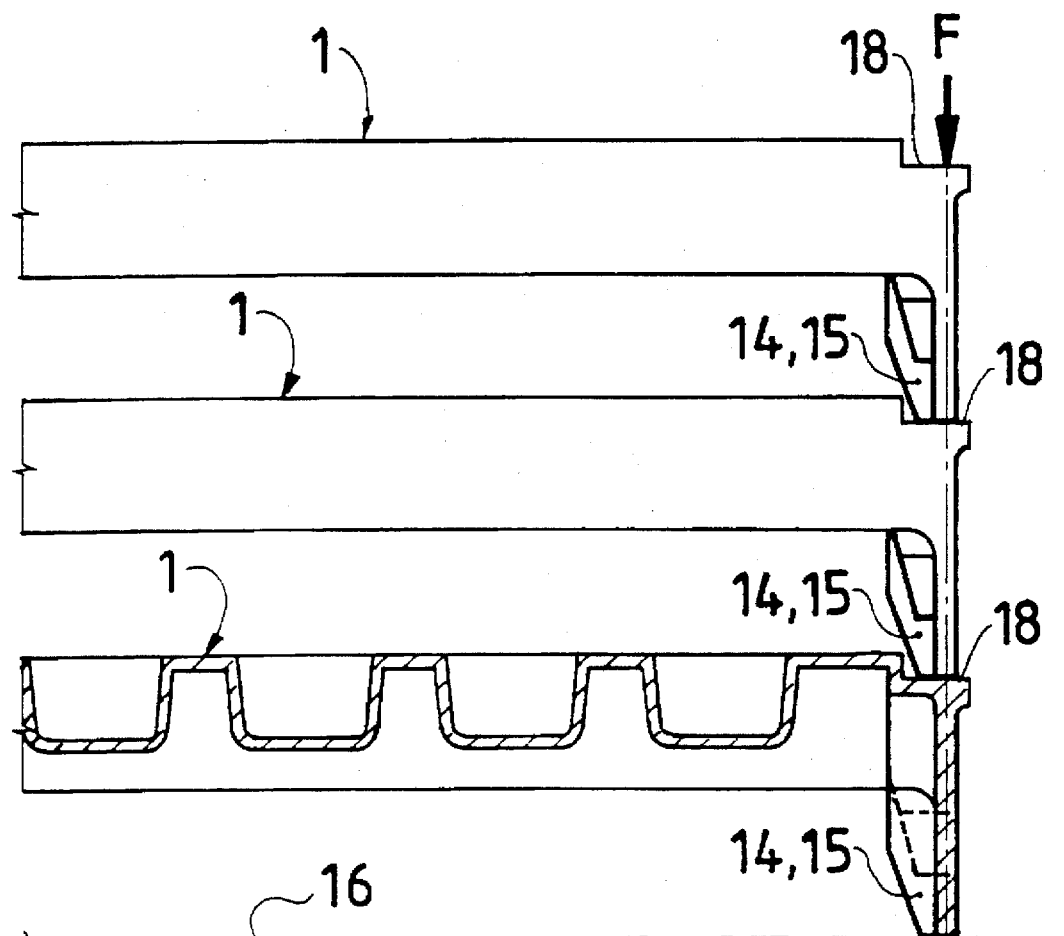
FIG. 4 shows a detail of a plurality of stacked molds.

The feet 12, 13 and 14, 15 which form a means of delimiting the side of the mold 1 with respect to the guide rods 5, 6 [sic]. In addition, as may be seen from FIG. 4, the feet 12, 13 and 14, 15 form a sturdy means of support for the mold 1 on a support surface 16, or on an underlying mold in cases where several molds 1 are being stacked one on top of the other in order to form a column. In such cases all the forces F generated are exerted through the structure of the support feet 12, 13, 14, 15, thereby avoiding undesired bending of the mold 1.

It is particularly advantageous for the lateral ends of each mold 1 to have a step-like indentation 17, 18 respectively, which forms a recess for accurately accommodating the feet 12, 13, 14, 15 of the mold positioned above, thereby ensuring maximum accuracy of positioning and maximum stability for a stack made up of several molds 1.

Advantageously the feet 12, 13, 14, 15 projecting from the body of the mold 1 have a rib-like structure so as to increase in this way its rigidity and its resistance to mechanical stresses.

Figure 5:
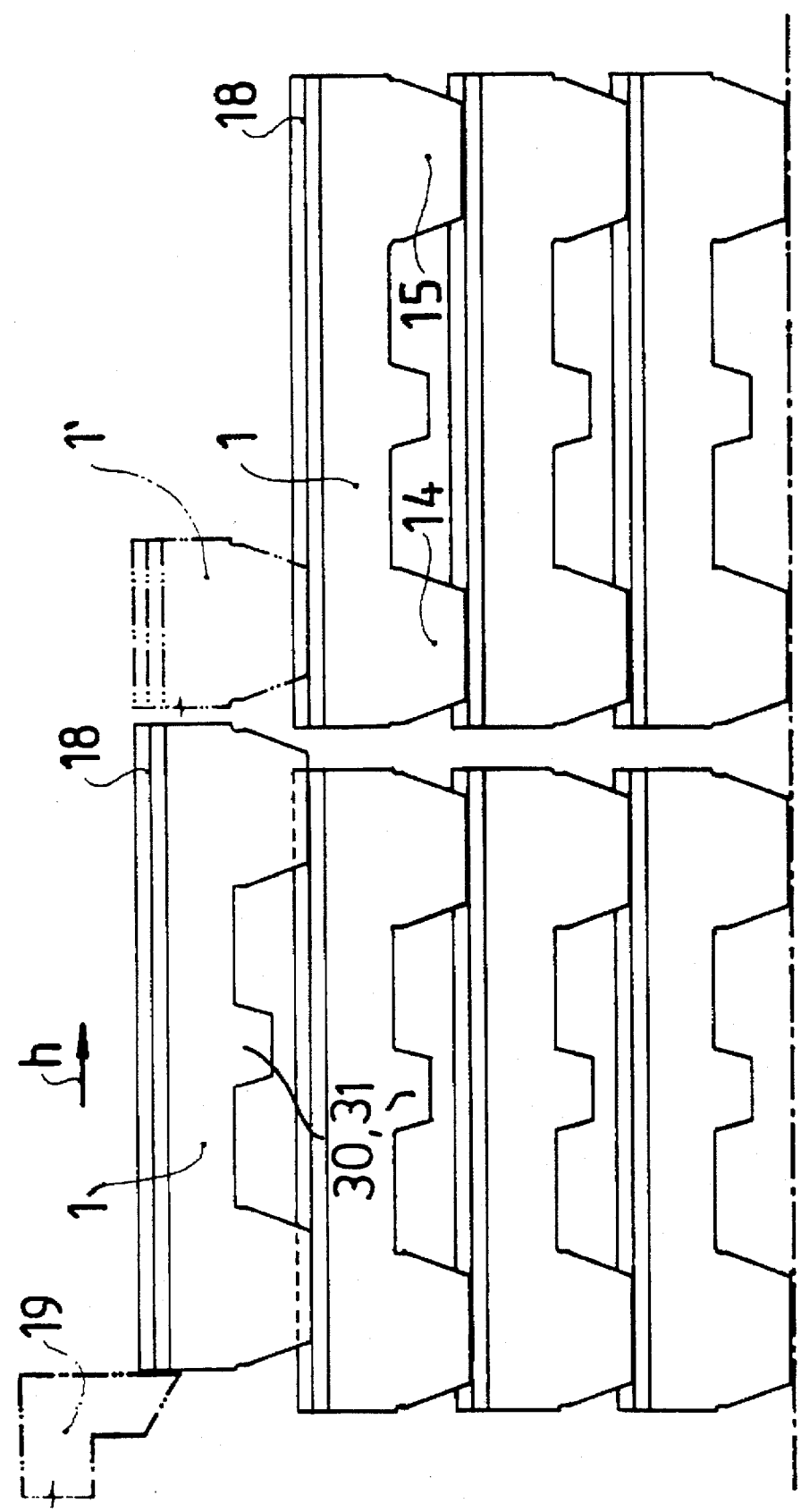
FIG. 5 shows a front view of several stacked molds.

The step-like indentation (17, 18) provided on each short side of the mold 1, together with the the molds 1 to be positioned in a single column or in parallel columns to the same height and enable the top mold 1 in a column to be moved along a horizontal plane, a mold 1 to be transferred in the direction indicated by the arrow (h) from one stack to an adjacent stack, as indicated diagrammatically with dot and dash lines 1' (FIG. 5).

Figure 6:
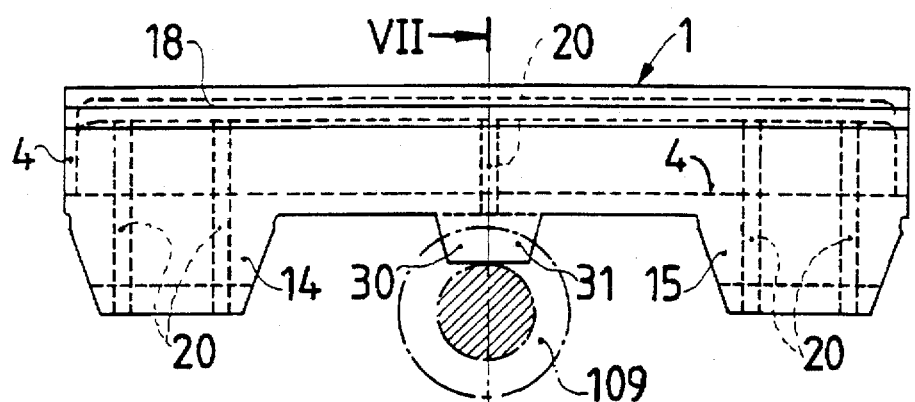
FIG. 6 shows a front view of a mold.

FIG. 6 shows the mold 1 in a front view of its shorter side, with the conveying screw indicated in dot and dash lines.

In addition, FIG. 6 shows the peripheral edge 4 of the mold 1 and the reinforcing ribbing 20 which gives rigidity to the mold 1. In addition, FIG. 6 clearly shows the extension of the step-like indentation 18.

It is particularly advantageous for the mold 1 to be reinforced by means of ribs 20 which enable the construction of an extremely light but at the same time robust structure which is capable of withstanding the stresses arising during use.

Figure 7:
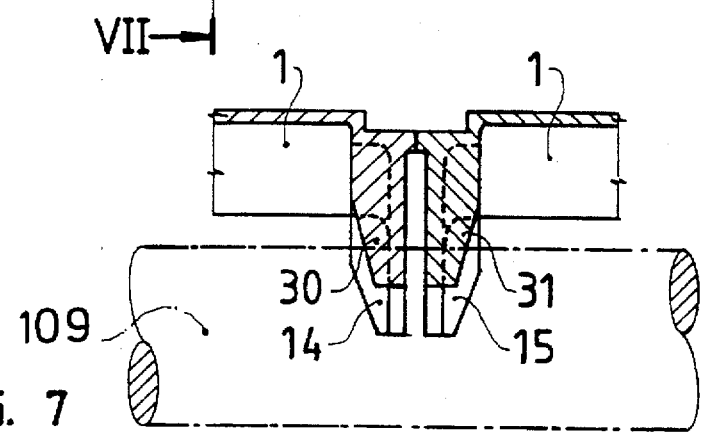
FIG. 7 shows a detail of the ends of two molds in section along the line VII—VII of FIG. 6.

FIG. 7 shows a detail of the shorter ends of the mold 1, facing one another. A semiprotrusion 30, 31 projects from the end of each mold 1, between the feet, for example 14 and 15 respectively. When the semiprotrusions 30, 31 are joined together, they enable a central conical protrusion to be formed, which can engage with the turns of a screw 32 provided for example to convey the mold transversely, for example when the plant track needs to follow a deviation around a corner.

Figure 8:
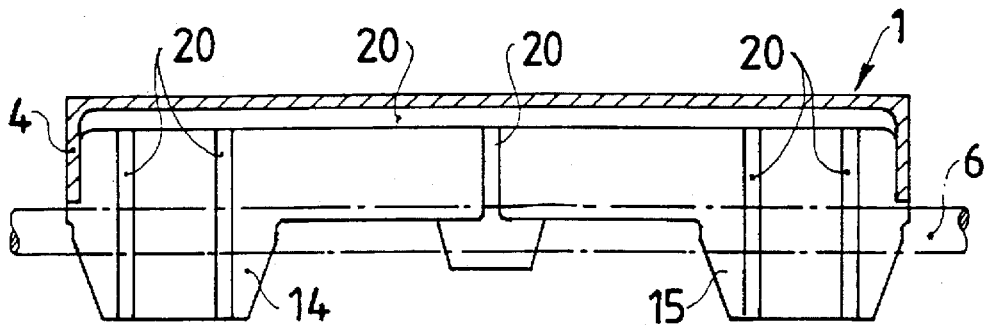
FIG. 8 shows the mold in section along the line VIII—VIII of FIG. 2.

FIG. 8 shows the mold 1 in section along the line VIII—VIII of FIG. 2.

The circumferential edge 4 surrounding the flat surface of the mold can clearly be seen, also visible are the reinforcing ribs 20, the legs 14, 15 respectively, and a guide rod 6 indicated with dot and dash lines.

FIG. 9 shows the mold 1 in section along the line IX—IX of FIG. 2.

In addition to the peripheral reinforcing edge 4, the protrusions 7 and 8, which are advantageously conical in shape and taper downwards, may be seen. The protrusions 7 and 8 are engaged in the turns of the conveying screw 9 which, once set in rotation, enables the mold 1 to move in the direction indicated by the arrow f.

Figure 10:
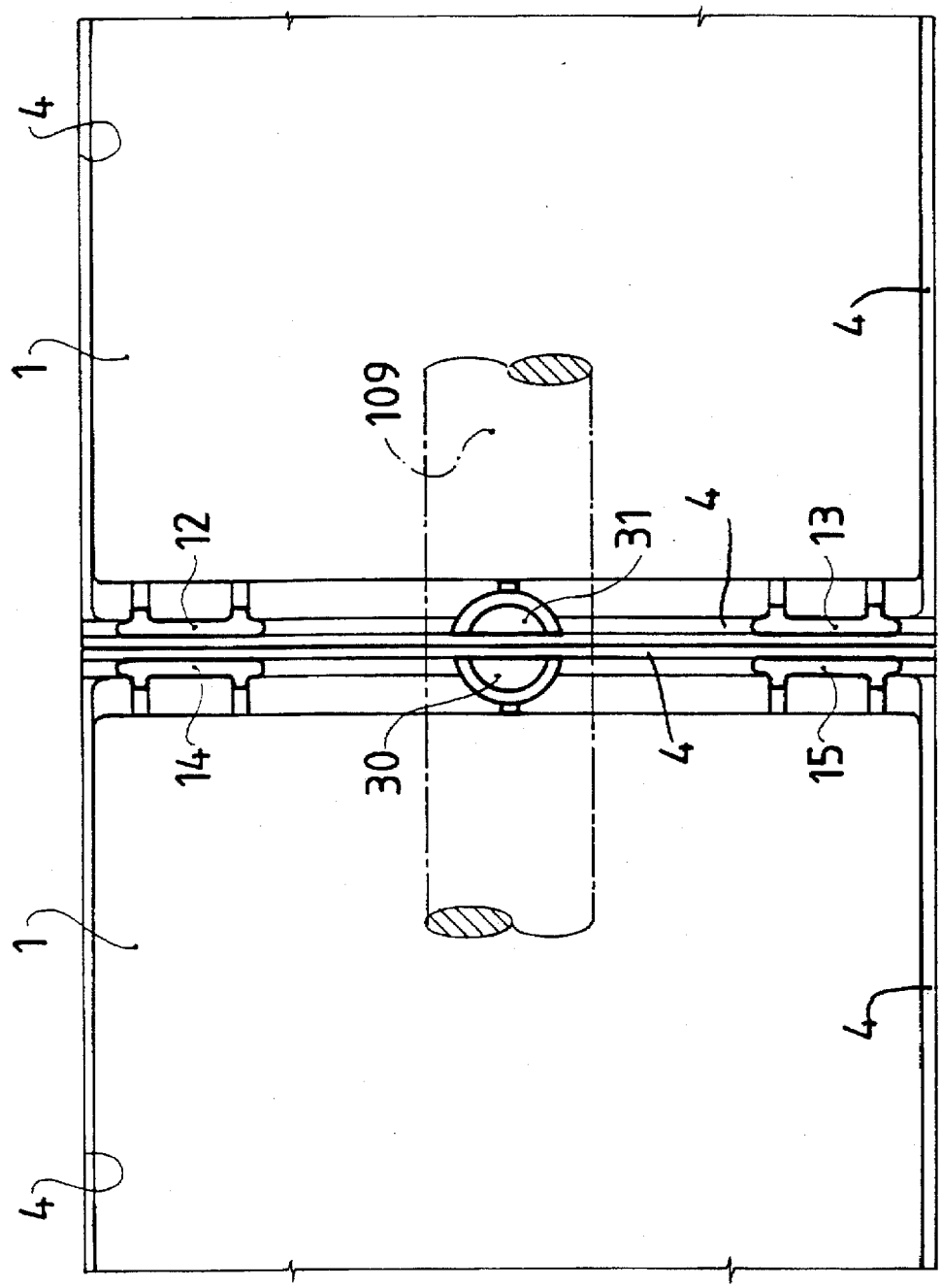
FIG. 10 shows the ends of two molds joined end-to-end seen from below.

In FIG. 10, which illustrates the ends of two molds 1 in contact with each other, may be seen the peripheral edge 4 and the support feet 14 and 15 on the one hand and 12 and 13 on the other.

Advantageously, the feet 12, 13, 14, 15 are made in the form of ribbed bodies, in order to ensure maximum rigidity and stability.

Also visible in FIG. 10 are the semiprotrusions 30, 31 which, when the ends of the mold 1 are in mutual abutment, as illustrated in FIG. 10, form a single frustoconical body which, by engaging with a screw 109 for transverse conveying, enables the molds 1 to be translated transversely, preventing the molds 1 from losing the mutual pitch between them.

I claim:

1. A mold conveying arrangement, comprising:

a) a mold having at least one well for receiving a moldable product to be conveyed through molding workstations, said mold extending along a longitudinal direction between opposite end regions, and also extending along a transverse direction perpendicular to said longitudinal direction, said mold having a central region extending between said end regions and a plurality of projections generally extending in a downward direction perpendicular to said longitudinal and transverse directions, said projections being situated at the central region and being spaced apart along the transverse direction; and b) movable conveying means extending along the transverse direction below the central region of the mold, said conveying means having means for engaging the projections and for moving the mold along the transverse direction.

2. The arrangement of claim 1, wherein the mold has a plurality of wells arranged in rows along the longitudinal direction, and in columns along the transverse direction.

3. The arrangement of claim 1, wherein the conveying means is a rotary drive screw having a thread that movably engages the projections.

4. The arrangement of claim 1, wherein there are two of said projections spaced apart of each other along the transverse direction.

5. The arrangement of claim 4, wherein each projection has a generally trapezoidal configuration in elevational view.

6. The arrangement of claim 4, wherein the mold has a transversely-extending central rib along the central region, and wherein the projections are integral with the central rib.

7. The arrangement of claim 1, wherein the mold has a generally quadrilateral shape with four corners, and a plurality of feet extending along the downward direction and respectively located at the corners, said feet being operative for supporting the mold relative to a support surface.

8. The arrangement of claim 7; and further comprising another mold identical to, and stackable with, said first-mentioned mold, and wherein said first-mentioned mold has a peripheral stepped surface on which the feet of the other mold are stackably supported.

9. The arrangement of claim 8, wherein each mold has an end protrusion between the feet at a respective end region.

10. The arrangement of claim 9; and further comprising a drive extending along the longitudinal direction, and operative for conveying the molds along said longitudinal direction by engaging the end protrusion on each mold.

11. The arrangement of claim 1, and further comprising guide rods underneath the mold at said end regions for supportably guiding the mold during operation of the conveying means.

* * * * *